United States Patent [19]
Niggemann et al.

[11] Patent Number: 4,690,210
[45] Date of Patent: Sep. 1, 1987

[54] FLUID JET IMPINGEMENT HEAT EXCHANGER FOR OPERATION IN ZERO GRAVITY CONDITIONS

[75] Inventors: Richard Niggemann; John Readman, both of Rockford, Ill.

[73] Assignee: Sundstrand Corporation, Rockford, Ill.

[21] Appl. No.: 750,166

[22] Filed: Jul. 1, 1985

[51] Int. Cl.⁴ .............................. F28D 7/00; F28F 9/22
[52] U.S. Cl. ..................................... 165/159; 165/160; 165/908; 62/54
[58] Field of Search ............... 165/160, 161, 908, 159; 62/54

[56] References Cited

U.S. PATENT DOCUMENTS

| | | | |
|---|---|---|---|
| 706,902 | 8/1902 | Condict | 165/160 |
| 727,391 | 5/1903 | Leman | 165/161 |
| 1,797,894 | 3/1931 | Armbrust | 165/159 X |
| 1,893,484 | 1/1933 | Belt | 165/163 X |
| 2,218,097 | 10/1940 | Rhodes | 165/161 X |
| 2,787,889 | 4/1957 | Swank | 62/4 |
| 2,916,264 | 12/1959 | Rhodes | 165/161 X |
| 3,034,769 | 5/1962 | Bertin et al. | 165/908 |
| 3,086,372 | 4/1963 | Barger et al. | 62/222 |
| 3,090,212 | 5/1963 | Anderson et al. | 62/467 |
| 3,109,495 | 11/1963 | Fortier | 165/1 |
| 3,122,891 | 3/1964 | Thomas | 62/45 |
| 3,147,593 | 9/1964 | Garrett | 60/39.46 |
| 3,232,066 | 2/1966 | Petersen et al. | 62/54 X |
| 3,414,753 | 12/1968 | Hruda | 165/908 X |
| 3,482,625 | 12/1969 | Bray | 165/160 X |
| 3,733,838 | 5/1973 | Delahumty | 62/54 |
| 3,800,550 | 4/1974 | Delahumty | 62/54 |
| 3,804,159 | 4/1974 | Searight et al. | 165/181 X |
| 3,843,910 | 10/1974 | Ringuet | 165/107 |
| 3,967,938 | 7/1976 | Daeschler et al. | 62/54 X |
| 4,108,242 | 8/1978 | Searight et al. | 165/164 |
| 4,110,091 | 8/1978 | Daeschler et al. | 62/54 |
| 4,202,408 | 5/1980 | Temple | 165/164 X |
| 4,306,614 | 12/1981 | Maggiorana | 165/161 X |
| 4,352,392 | 10/1982 | Eastman | 165/104.25 |

Primary Examiner—Stephen F. Husar
Assistant Examiner—Randolph A. Smith
Attorney, Agent, or Firm—Wood, Dalton, Phillips, Mason & Rowe

[57] ABSTRACT

Liquid-vapor phase separation in reservoirs for cryogenic liquid propellants in space vehicles at zero gravity conditions is achieved through a system including a unique heat exchanger. A mixed phase inlet stream is partially separated by centrifugal force imparted to the stream by swirl inducers as the stream enters the inlet of the heat exchanger. Lesser density components are provided to the interior of a spiralled tube forming part of a heat exchanger to be condensed therein by the higher density components which are applied to such tube within the heat exchanger. Heat transfer efficiency is mzximized by making the tube of rectangular cross section and providing liquid impingement jets active on three sides of the tube and by providing a baffle which forces the heat transfer fluid to further cool the tube by convection on the remaining side thereof.

6 Claims, 3 Drawing Figures

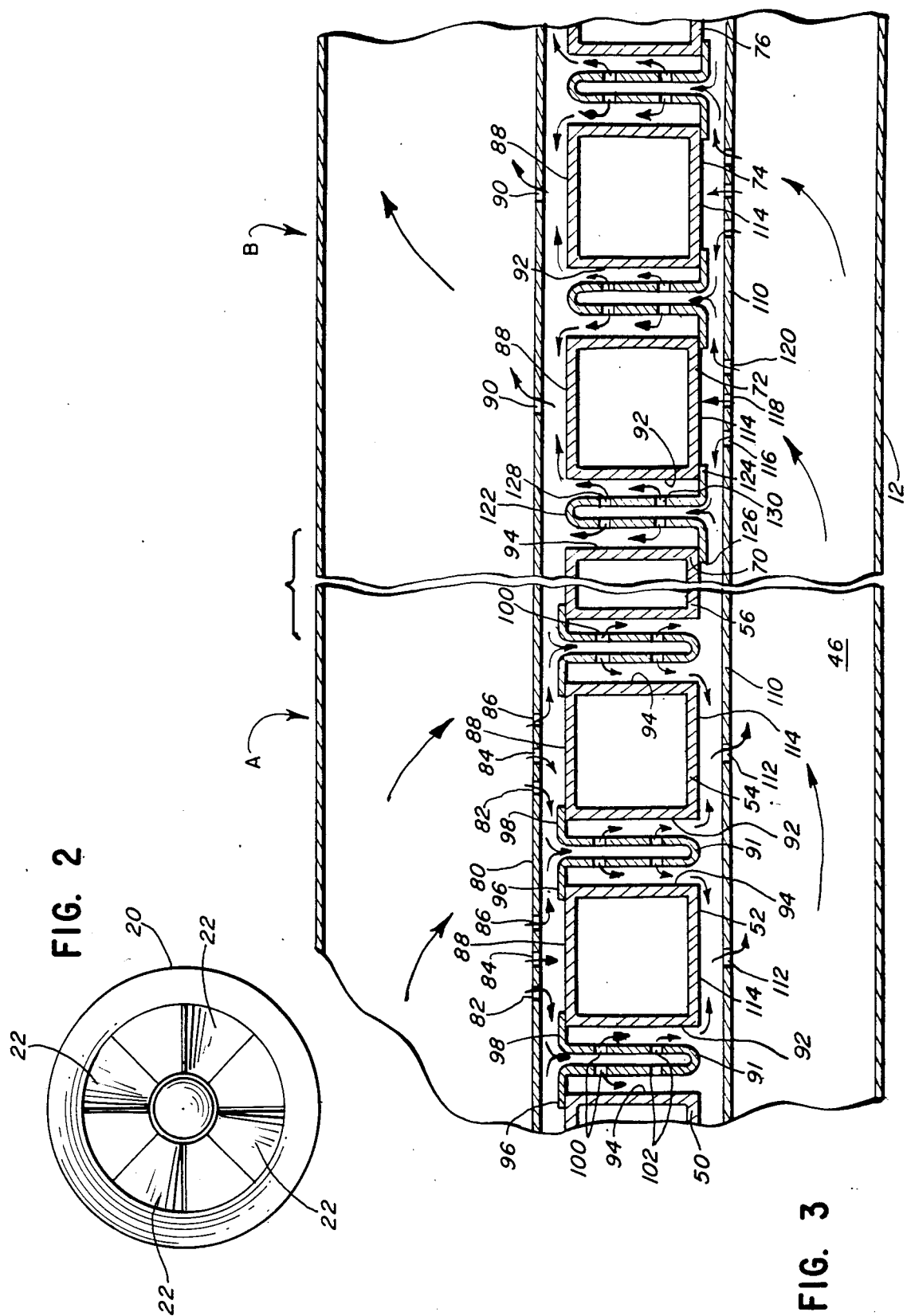

FLUID JET IMPINGEMENT HEAT EXCHANGER FOR OPERATION IN ZERO GRAVITY CONDITIONS

FIELD OF THE INVENTION

This invention relates to heat exchangers of the fluid jet impingement type, and with greater particularity, to such a heat exchanger adapted to be employed in zero gravity conditions as are encountered by spacecraft.

BACKGROUND OF THE INVENTION

Many spacecraft carry cryogenic liquids for use as propellants in accomplishing various trajectory adjustments while in orbit. Heat is continually absorbed by the cryogenic liquid which results in an increase in the pressure and temperature in the tank in which the liquid is maintained. Because of weight concerns, the tank is typically a relatively low pressure vessel. Thus, tank pressure and temperature must be controlled to avoid undesirable build-up and this is conventionally controlled by venting vapor from the tank.

However, because of the zero gravity condition experienced by the spacecraft, the liquid and vapor phases within the tank are not separated to allow vapor to be vented to the exclusion of the liquid. Thus, separation of the phases to allow venting of only vapor has conventionally been accomplished by accelerating the vehicle in its orbit causing the liquid, because of its greater density, to separate from the vapor. In many instances, this is a satisfactory means of handling the problem. However, in some instances, as in the case of a liquid fueled rocket carried in the cargo bay of a space shuttle, such a method of separating liquid from the vapor cannot be used while the rocket remains within the cargo bay while the shuttle is in orbit.

Thus, the present invention is directed to overcoming the problem of venting vapor build-up and to providing a unique heat exchanger that may be used in overcoming such problem.

SUMMARY OF THE INVENTION

It is the principal object of the invention to provide a new and improved heat exchanger. It is also an object of the invention to provide a heat exchanger that may be utilized in spacecraft in connection with the venting of pressure buildup in a cryogenic liquid utilized as a propellant in spacecraft.

An exemplary embodiment of a heat exchanger made according to the invention employs combined impingement and convection heat exchange operations. The same includes a plurality of spaced tube sections in side-by-side relation. The tube sections have generally rectangular cross sections and are adapted to receive a first fluid in a heat exchange operation. Baffle means surround the tube sections and include a first barrier adjacent to and extending about three sides of each of the tube sections with generally U-shaped channels disposed between adjacent ones of the tube sections. The first barrier has a plurality of rows of apertures, at least one row for each of the three sides of each of the tube sections. The apertures open toward the adjacent side of the associated tube section and are adapted to cause a second fluid in a heat exchange operation in passing through the apertures, to impinge on such adjacent side along the length of the rows. A second barrier is located oppositely of the first barrier and adjacent to the remaining side of each of the tube sections. It cooperates with the first barrier to substantially enclose the tube sections. The second barrier has a plurality of rows of second fluid exit ports, one row for each of the tube sections that open away from such remaining sides of the tube sections.

As a consequence of such construction, the second fluid will be placed in heat exchange relation with the tube sections by impingement on the three sides thereof which are adjacent to the first barrier and by convection on the remaining side of each of the tube sections.

Where the heat exchanger is particularly suited for use in a zero gravity condition, the same may include a spirally coiled tube defining the tube sections and a housing containing the tube. An inlet is provided to the housing centrally of the tube and includes swirl inducing means for imparting rotation to a fluid entering the housing.

The housing is also provided with an outlet opposite the inlet, which outlet may be adapted to be connected to a vent to space and a port is provided centrally within the housing and just down stream of the swirl inducing means and in fluid communication with the interior of the tube. The port provides fluid communication for lesser density components of an incoming fluid stream to the interior of the tube.

A baffle structure radially outwardly of the port and surrounding the tube is provided for causing higher density components of an incoming fluid stream to impinge upon the tube before passing to the outlet.

In a highly preferred embodiment, the baffle structure is generally as stated previously.

In a highly preferred embodiment, the barriers employed in the heat exchanger each include apertured plates and preferably, the first barrier includes an apertured plate spaced from and facing the central one of the three sides adjacent the first barrier with the U-shaped channels being separate from the plates and having their interiors in fluid communication with the space between the plate and the central sides.

The invention contemplates that the ends of the legs of the U-shaped channels be at least nominally sealed to adjacent ones of the tube sections in the vicinity of the junctions of the central side with the adjacent sides of the tube sections.

In a highly preferred embodiment, there are plural ones of the rows of apertures in the first barrier for each of the three sides of the tube sections to maximize heat transfer by impingement.

Other objects and advantages will become apparent from the following specification taken in connection with the accompanying drawings.

DESCRIPTION OF THE DRAWINGS

FIG. 2 is an elevational view looking at the inlet of the heat exchanger; and

FIG. 3 is an enlarged, fragmentary sectional view of a portion of the heat exchanger.

DESCRIPTION OF THE PREFERRED EMBODIMENT

Figure 1:
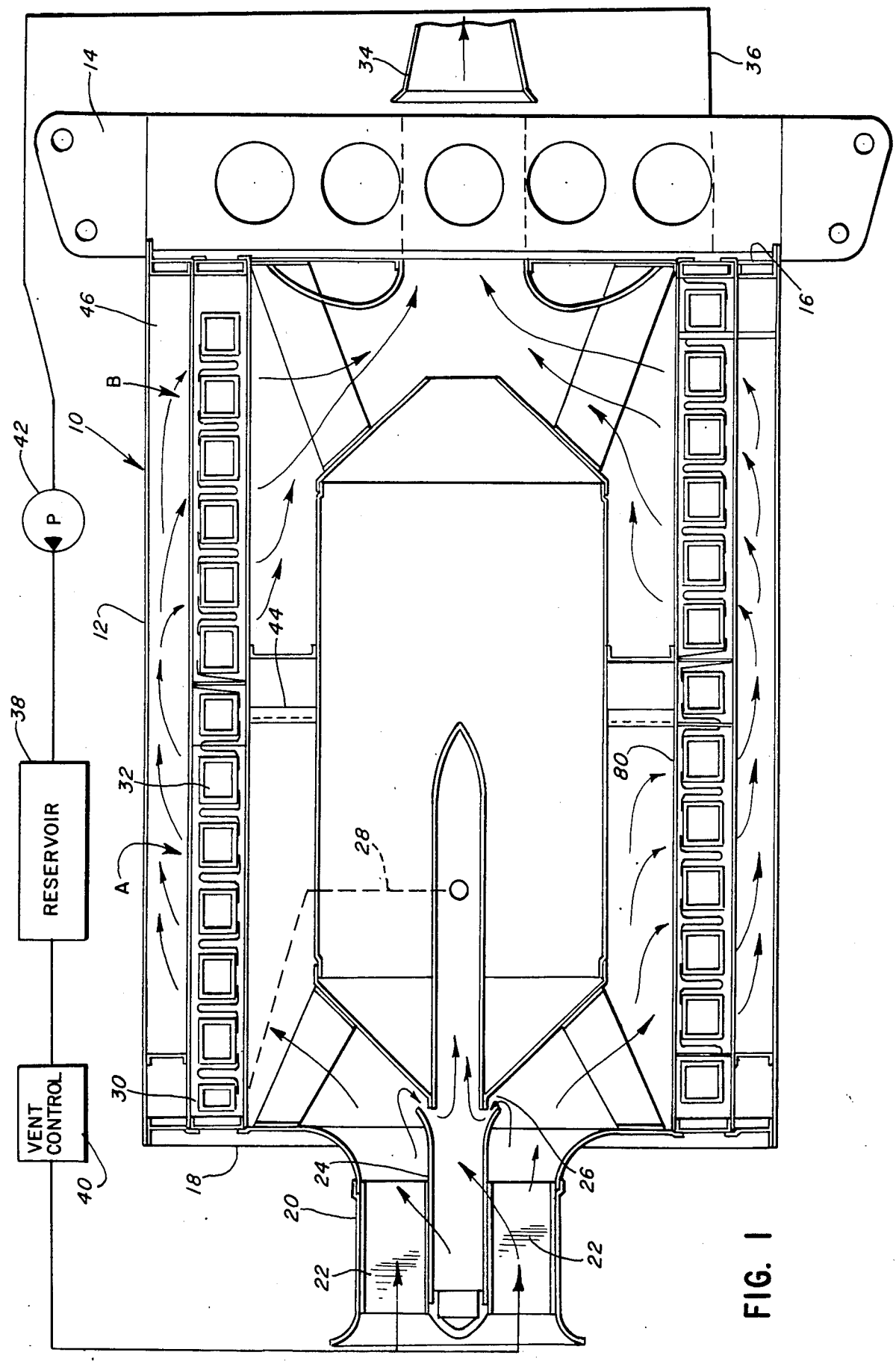
FIG. 1 is a sectional view of a heat exchanger made according to the invention with components of a system in which the heat exchanger is employed under zero gravity conditions shown schematically.

An exemplary embodiment of a heat exchanger made according to the invention is shown in the drawings and with reference to FIG. 1 is seen to include a housing, generally designated 10, having an imperforate cylindrical exterior 12. Mounting components 14 may be disposed on one end 16 of the housing exterior 12. At the opposite end 18 of the heat exchanger, and centrally of the cylindrical exterior 12 is a reduced diameter, cylindrical inlet 20. As seen in FIGS. 1 and 2, the inlet 20 includes radially and spirally directed plates 22 supporting a central tube 24. The plates 22, because of their spiral configuration, act as swirl inducers. Fluid entering the heat exchanger 10 via the inlet impart rotary motion to the incoming fluid. As a consequence, higher density components of the incoming fluid, such as entrained liquid, due to centrifugal force, will tend to move radially outwardly within the housing 12. Conversely, lesser density components of the incoming fluid, such as the vapor phase of the fluid, will tend to remain relatively centrally within the housing 10.

If desired the plates 22 may be rotated by a small motor to enhance swirl inducement.

The central tube 24 includes an inlet 26 opening in a direction away from the inlet 20, that is, towards the end 16 of the housing exterior 12. Consequently, the lesser density components of the inlet stream may enter the interior of the tube 12 via the inlet 26. By suitable means, shown schematically at 28, the interior of the tube 24 is in fluid communication with the interior of one end 30 of a spiralled tube 32. The spiralled tube 32 is formed as a helix of tubing having a rectangular, and specifically, square cross section. As can be seen from FIG. 1, the outer diameter of the spiralled tube 32 is somewhat less than the inner diameter of the housing exterior 12. At the same time, the inner diameter of the spiralled tube 32 is considerably greater than the diameter of the inlet 20.

The spiralled tube 32 forms part of a heat exchanger wherein heat exchanged between the higher density components of the inlet stream and lower density components of the inlet stream occurs. In the preferred environment of use, namely, spacecraft operation, the higher density components are employed to absorb heat from the lesser density components. After passing through the heat exchanger including the spiralled tube 32, those components that were originally of relatively high density may be vented to space via an outlet 34 at the end 16 of the heat exchanger 10, the outlet 34 being disposed centrally of the housing exterior 12.

Those components that were originally of lesser density and are contained within the tube 32 exit via a line shown schematically at 36.

In a space environment, cryogenic liquid propellant is stored in a reservoir 38 including a vent control system 40 therefor. A low power pump 42 is utilized to circulate the fluid when the vent control 40 requires such circulation as, for example, when there is a pressure buildup. Consequently, in such a system, the outlet of the reservoir 38 is connected via the vent control 40 to the inlet 20 of the heat exchanger. The pump 42 is connected to the inlet of the reservoir 38 as well as to the outlet of the heat exchanger via the line 36 as shown in FIG. 1.

In operation, the heat exchanger receives a controlled volume of fluid from the reservoir 38 whenever conditions in the reservoir 38, as determined by the vent control 40, warrant it. The liquid containing or high density component of the fluid will ultimately flash to vapor within the heat exchanger whereas the low density or predominantly vapor fraction is circulated within the spiralled tube 32.

As a consequence, the vaporization of the liquid containing component causes cooling of the tubes and ultimately condensation of the original predominantly vapor component within the spiral tube 32 which will then be returned to the reservoir 38 by the pump 42. The vapor that results from the heat exchange operation is vented via the outlet 34.

In order to maximize efficiency, the heat exchanger 10, to the outer diameter of the spiral tubes 34 is provided with a diametral baffle 44. This, in effect, divides the heat exchanger into an inlet section shown at A, and an outlet section shown at B. As indicated by the arrows in FIG. 1, the high density components in the inlet section A may move radially outwardly and axially past the tube 32 to emerge in an annular space 46 radially outwardly of the tube 32. Flow is generally axially from the inlet section A to the outlet section B. At this point, the material moves radially inwardly and axially toward the outlet 34.

In order to maximize the efficiency of the heat exchange operation, the invention contemplates means of obtaining a very high heat transfer coefficient with minimal pumping power since some of the pumping power is provided to the fluid and tends to heat the same, ultimately causing the pressure rise in the reservoir 38 which is to be avoided.

As seen in FIG. 3, adjacent convolutions, 50, 52, 54, 56, 70, 72, 74 and 76 of the spiral tube 32 are spaced from each other. Radially inwardly of the spiral tube 32 is an annular baffle or plate 80 which is closely adjacent to but spaced from, the radially inner facing surfaces of the convolutions 50-76. In the inlet section A, the baffle 80 has three spiralled rows of apertures 82, 84, 86; and the rows are aligned with the radially inner surfaces 88 of the convolutions 50-76.

Conversely, on the outlet side B, the radially inner baffle 80 includes but a single row of apertures 90 aligned with the radially inner side 88 of the convolutions 50-76.

An elongated spiralled channel of generally U-shaped cross section shown at 91 is disposed between facing sides 92 and 94 of adjacent convolutions 50-76 on the inlet side A. In the inlet section A, the channel 91 opens radially inwardly and the ends of the legs thereof are oppositely directed as shown at 96 and 98. The leg ends 96 and 98 are nominally sealed against the radially inner surface 88 of adjacent ones of the convolutions 50-56 and are in fluid communication with the annular space that exists between the baffle 80 and the radially inner sides 88 of the convolutions 50-56. In addition, each of the legs of the channel 91 include two rows of apertures 100 and 102 which are directed at the facing surfaces 92 and 94 of the adjacent convolutions 50-56.

The spiralled tube 32 is surrounded by a radially outer baffle 110 and, in the inlet section A, includes a single spiralled row of apertures 112 aligned with the radially outer faces 114 of the convolutions 50-56. The apertures 112 open to the annular space 46.

Moving to the outlet section B, the baffle 110 includes three spiralled rows of apertures 116, 118 and 120 which are aligned with the radially outer faces 114 of the convolutions 70-76. Additionally, a spiralled channel 122 is disposed between the adjacent convolutions 70-76 and is generally identical to the channel 91 with the exception that it opens radially outwardly rather than radially inwardly. The channel 122 has oppositely directed legs 124 and 126 nominally sealed to the radially outer surfaces 114 of adjacent ones of the convolutions 70-76 as well as spiralled rows of apertures 128 and 130 aligned with facing surfaces 92 and 94 of adjacent ones of the convolutions 70-76.

As a result of this construction, a liquid jet impingement heat exchanger is provided to produce the desirable very high heat transfer coefficient with minimal pumping power. In the embodiment of the invention illustrated in FIG. 3, it will be appreciated that liquid jet impingement will occur on three sides of the tube convolutions as a result of a liquid containing fluid being directed by the apertures 82, 84, 86, 100 and 102 against the radially inner surfaces 88 and the facing surfaces 92 and 94 of the convolutions 50-56. Efficiency is further maximized through the use of a single row of the apertures adjacent the remaining surfaces 114 of the convolutions 50-56 in that, as shown by the arrows in FIG. 3, the partially or wholly vaporized liquid must flow by such side before it can pass through the baffle 110 thus providing a measure of convective heat transfer as well.

In the outlet section B, the same action occurs with the exception that the radial direction of flow is opposite that occurring in the inlet section A.

As alluded previously, vapor is condensed within the convolutions 50-76 and returned as a liquid to the reservoir 38 for conservation purposes. At the same time, the liquid that has flashed to a vapor in the heat exchange process may be vented to space in 100% vapor phase form. Consequently, the system lends itself to use in those situations where acceleration of the space vehicle to achieve liquid-vapor phase separation prior to venting is impractical.

It will also be appreciated that the invention provides a unique, liquid jet impingement heat exchanger wherein efficiency is maximized through the use of liquid jet heat transfer on three sides of tubes forming part of the heat exchanger and convection heat exchange on the remaining side.

What is claimed:

1. A heat exchanger particularly suited for use in zero gravity conditions comprising
   a spirally coiled tube;
   a housing containing said tube;
   an inlet to said housing centrally of said tube including swirl inducing means for imparting rotation to a fluid entering said housing;
   an outlet from said housing opposite of said inlet;
   a port centrally within said housing and just downstream of said swirl inducing means and in fluid communication with the interior of said tube through which lesser density components of an incoming fluid stream may pass to said tube interior; and
   a baffle structure radially outwardly of said port and surrounding said tube for causing higher density components of an incoming fluid stream to impinge upon said tube before passing to said outlet.

2. The heat exchanger of claim 1 wherein said tube is of rectangular cross section and adjacent convolutions thereof are spaced, said baffle including an apertured plate extending circumferentially of said tube with the apertures in the plate aligned with one circumferential surface of said tube, and apertured channels disposed between said convolutions with the apertures in said channels being aligned with facing radial surfaces of adjacent convolutions of said tube.

3. The heat exchanger of claim 2 wherein said apertured plate is at the radially inner surface of said coiled tube.

4. The heat exchanger of claim 2 wherein said apertured plate is at the radially outer surface of said coiled tube.

5. The heat exchanger of claim 2 wherein, adjacent said inlet, said apertured plate is adjacent the radially inner circumferential surface of said tube, and, adjacent said outlet, said apertured plate is adjacent the radially outer circumferential surface of said tube.

6. The heat exchanger of claim 2 wherein there is a further baffle adjacent to the other circumferential surface of said tube for causing fluid that has impinged upon the first mentioned circumferential surface or said radial surfaces to flow across said other circumferential surface.

* * * * *